July 27, 1926.  
J. J. HIGGINS  
1,593,824  
METHOD OF AND MACHINE FOR FORMING AND MOUNTING FILAMENTS  
Filed Nov. 10, 1922  3 Sheets-Sheet 1
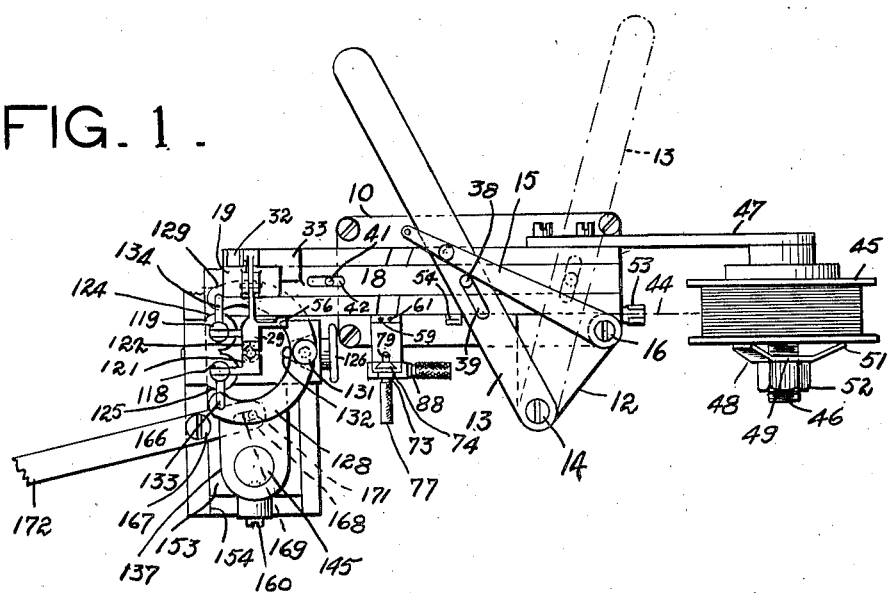
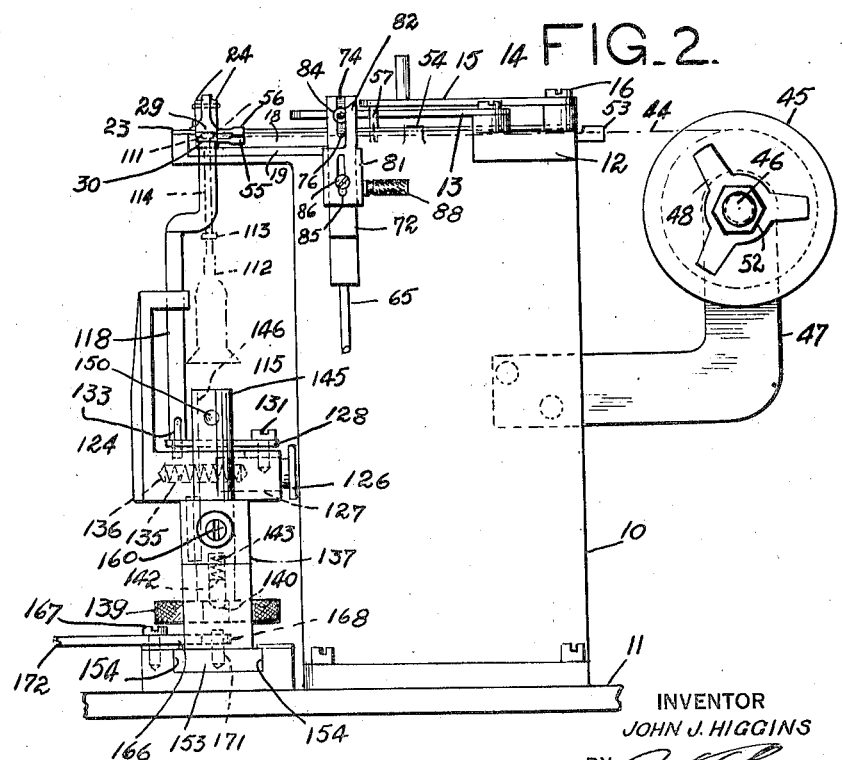
INVENTOR  
JOHN J. HIGGINS  
BY   
ATTORNEY July 27, 1926.
J. J. HIGGINS
1,593,824
METHOD OF AND MACHINE FOR FORMING AND MOUNTING FILAMENTS
Filed Nov. 10, 1922   3 Sheets-Sheet 2
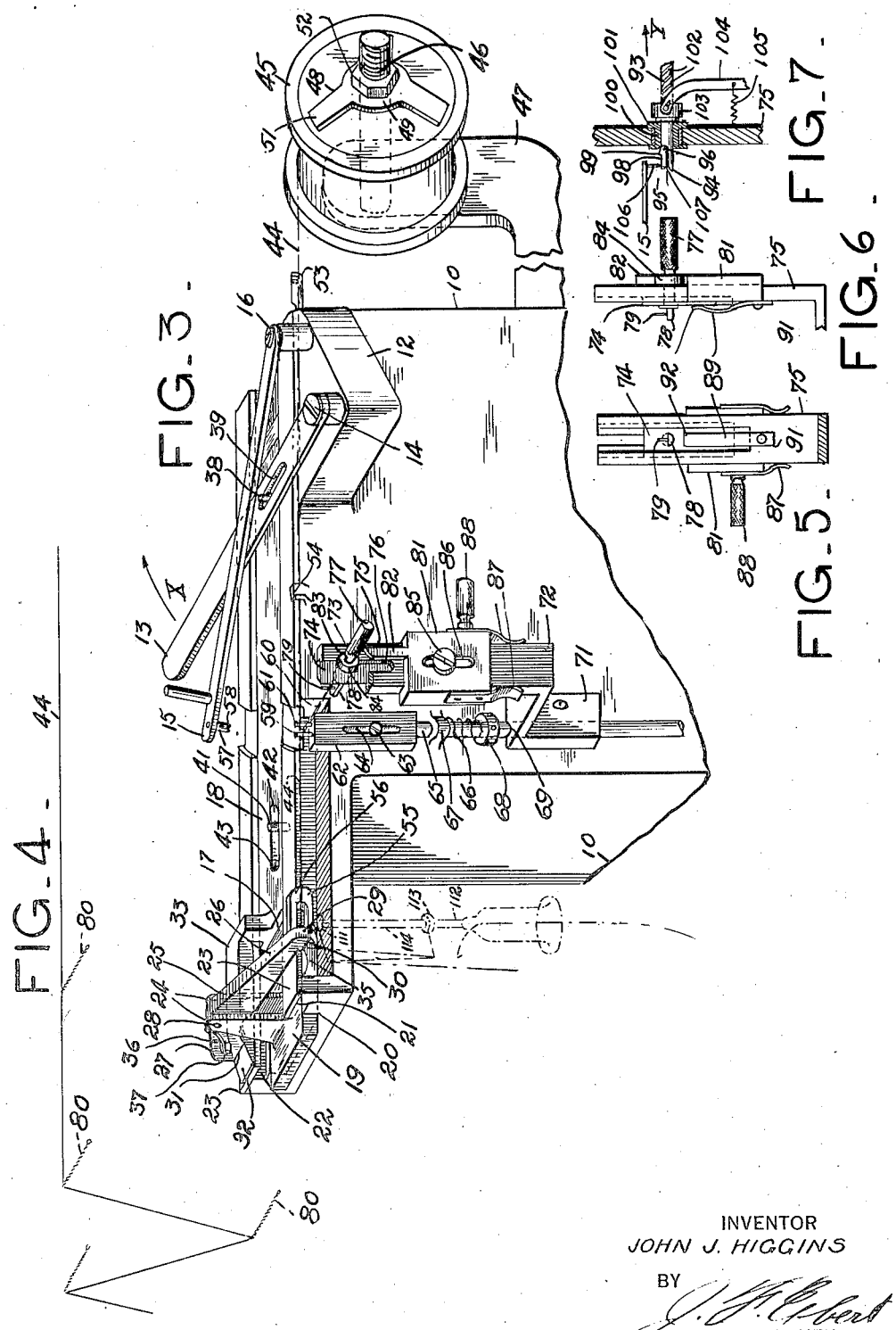
INVENTOR
JOHN J. HIGGINS
BY
ATTORNEY July 27, 1926. 1,593,824
J. J. HIGGINS
METHOD OF AND MACHINE FOR FORMING AND MOUNTING FILAMENTS
Filed Nov. 10, 1922   3 Sheets-Sheet 3
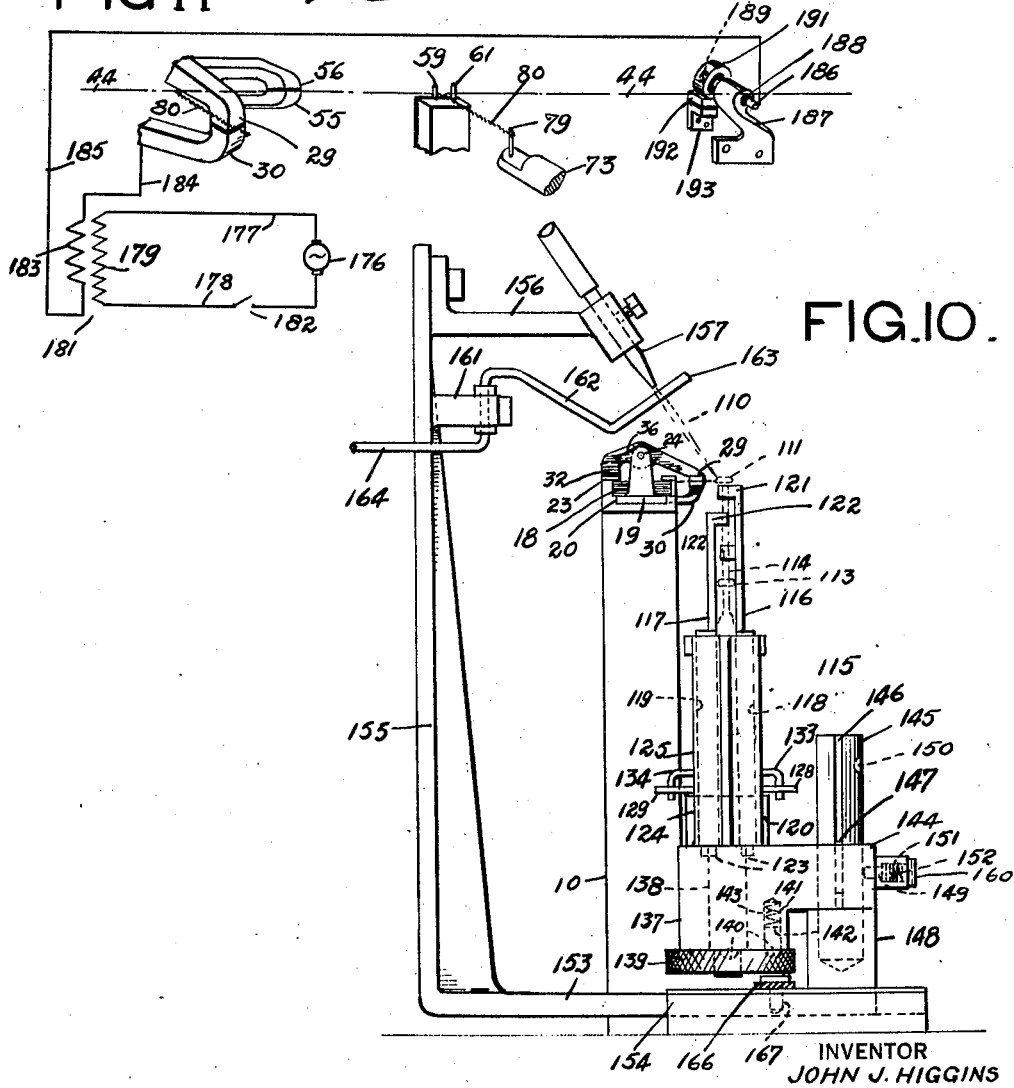

Patented July 27, 1926.

1,593,824

UNITED STATES PATENT OFFICE.

JOHN JOSEPH HIGGINS, OF EAST ORANGE, NEW JERSEY, ASSIGNOR TO WESTINGHOUSE LAMP COMPANY, A CORPORATION OF PENNSYLVANIA.

METHOD OF AND MACHINE FOR FORMING AND MOUNTING FILAMENTS.

Application filed November 10, 1922. Serial No. 600,072.

This invention relates to a method of and a machine for mounting a filament upon a non-conductive lamp part.

An object of the invention is to provide a machine which may be automatically operated to bind two sections of a filament or wire together to provide a strengthened portion which may be utilized as a support for the filament.

Another object of the invention is to provide mechanism which may be operated to twist two sections of a filament together to provide a flexible supporting member of sufficient strength to retain its position and in the provision of means for securing the end of the supporting members into a non-conductive lamp part.

A further object of the invention is to provide a machine which may be operated to produce a filament or wire having supporting members integral therewith.

A still further object is to expedite the manufacture of lamps by providing a machine which may be operated to produce supporting members integral with a filament or wire and insert the supporting members alternately in the upper and lower buttons of an arbor.

Other objects and advantages of the invention will be apparent from the following description.

A lamp, as ordinarily constructed, includes a mount which may consist of a stem composed of a flare tube having disposed therein two conductors or leading-in wires, an arbor, filament supports and a filament supported thereon. One end of an arbor is disposed in the end of a flare tube, and heat is applied until the arbor and end of the flare tube have become plastic; after which pressure jaws are applied to press and unite the two parts together, the leading-in wires being, at the same time, embedded in the material at the union of the arbor and flare tube, which union is usually termed the press or flare press. For the manufacture of the type of lamp to which this invention relates, the arbor has formed thereon, an end button and a button adjacent the union of the arbor with the flare tube. Support wires are then inserted radially in each of the buttons. A required number of support wires being inserted to accommodate a given length of filament wire, the same is then manually mounted by draping over hooks provided at the free ends of the support wires. The ends of the filament are suitably secured to the leading-in wires, and the mount then is ready to be incorporated in a lamp.

It has been found, however, that a desirable mode of forming a mount includes the provision of a filament in which the support wires are formed integral therewith by producing reinforced sections of the filament. This may be accomplished by looping a filament, preferably, at predetermined spaced intervals throughout its length. The loops may then be twisted so that the sections thereof are wound one about the other. In this manner, relatively strong members or supports are provided.

Although a filament constructed with integral supports is desirable, great difficulty has been experienced in producing the reinforced members and in handling the filament to insert the members into the buttons of a lamp stem. It will be appreciated that the filament is of a relatively delicate character and that careful handling is necessary and a considerable amount of time must be spent when manually producing and mounting a filament having the above mentioned integral support wires. Furthermore, since the supporting members are only double the cross sectional area of the filament wire, it will be seen that the insertion of these supports is a difficult one unless they are carefully handled.

The present invention contemplates the provision of a machine which may be operated to perform the functions necessary to the production of a filament or wire having sections thereof twisted to produce supports and which may be further operated to insert the supports into an arbor without the necessity of manual handling.

A machine embodying my invention may comprise a suitable bracket upon which a spool of filament or wire may be rotatably mounted. Adjacent the spool, a filament guide may be provided through which the filament is threaded and led to a position where it may be gripped by a pair of jaws. The jaws may then be operated to move the filament a given distance. Adjacent to the guides and suitably located with respect to the filament, may be provided a pair of guide posts. An oscillatory arm carrying a finger is preferably so disposed as to be moved substantially transversely to the path of the filament to carry the filament between the guide posts for a given distance, thus producing a loop.

The finger may then remain in position within the loop and a pin, mounted on a rotatable carrier, may be moved either into an aperture within the finger or in a groove at one side of the finger, thus permitting the pin to be positioned within the loop after which the finger may be removed. The pin may then be rotated to twist one section of the loop about the other and be subsequently removed from the twisted loop.

Gripping members or jaws may be provided and adapted to be moved to a position adjacent to the twisted section and to close thereon to grip the section. After the jaws have been secured about the twisted section which constitutes a support, the jaws may be moved to carry the support into operative relation to a button of a stem which is positioned in a suitable stem holder. Jaws, which grip the twisted section, may be so disposed at the end of the support that, when heat is applied to the button of the stem and a portion thereof has become sufficiently plastic, the mount holder may be moved to cause the end of the support wire to be inserted in the button.

The invention will be more fully understood by reference to the accompanying drawings, in which—

Fig. 1 is a plan view of a machine, certain of the parts of which have been removed;

Fig. 2 is a front view, in elevation, certain parts being removed for the sake of clearness;

Fig. 3 is a perspective view showing an upper portion of the machine and the relation of a stem thereto;

Fig. 4 is a perspective view of a bent filament having support members formed therein;

Fig. 5 is a detail view of a reciprocable carrier for a twisting tool and shows the bracket upon which the carrier is supported;

Fig. 6 is a side view of the device shown in Fig. 5;

Fig. 7 is a detail view of mechanism for securing and twisting a loop, parts of the supporting structure being shown in section;

Fig. 8 is a plan view of the mechanism illustrated in Fig. 7, on a slightly enlarged scale, parts being shown in section;

Fig. 9 is an end view of the same;

Fig. 10 is an end elevational view of the machine viewed from the end opposite to that upon which the spool of filament is mounted, also showing the relative position of a fire for heating a button and of a baffle plate for removing the fire from the button; and, Fig. 11 represents, diagrammatically, a means of heating the wire electically for the annealing operation.

An embodiment of my invention may comprise a standard 10, suitably secured at its lower end to a table 11. The upper end of the standard 10 may be provided with an offset bearing-arm 12 upon which is pivoted a lever 13 rotatable about a pin 14. Positioned above the lever 13 is a second lever 15 that is rotatable about a pin 16 with which the bearing-arm 12 is provided. The levers may be operated to move other elements and, in cooperation therewith, may loop and twist a wire.

The lever 13 operates a compound sliding member 17 (Fig. 3) which consists of an upper slide-bar 18 and a lower slide-bar 19. The lower slide-bar 19 is movable along the lower surface of a rectangular groove 20 and the upper bar is movable in guide slots 21 and 22 provided in the sides of the groove 20, guide plates 23 being provided to prevent upward movement of the slide-bar 18. The lower slide-bar 19 is provided with upright bearings 24 in which a lever 25, having a long arm 26 and a short arm 27, is pivoted upon a pin 28.

The arm 26 of the lever 25 terminates in a jaw 29, and the opposite arm or extension 27 of the lever is provided with a contact surface 31 for engagement with a spreader or wedge-shape member 32. The wedge-shape member may be integral with an overhung member 33 which is fastened to the upper slide-bar 18, and the wedge member 32 is, therefore, movable with the slide-bar.

When the wedge member 32 is positioned beneath the arm 27, the jaw 29 is moved into contact with another jaw 30 at the end of a projection 35 which is integral with the lower slide-bar 19. Thus, the slide-bar is provided with jaw faces which may be operated, by an action of the wedge member 32, to grip an object. A resilient member or spring 36 is provided to normally maintain the jaws 29 and 30 open, the spring being secured to the bearing 24 and adapted to exert a downward pressure upon a pin 37 projecting from the extension 27.

The lever 13 is associated with the upper slide-bar 18 by reason of a pin 38 secured to, and extending upwardly from, the slide-bar and through a slot 39 in the lever 13. It will be evident, therefore, that the initial movement of the lever in the direction of arrow "X" will result in a movement of the upper slide-bar 18. Thus, the wedge member will be carried from beneath the extension 27, and the jaws 29 and 30 will open.

The wedge member is so positioned as to be slidable along the upper surface of one of the plates 23. It is necessary, however, to reciprocate the jaws as a unit, and the upper slide-bar 18 is, therefore, connected to the lower slide-bar 19 by a pin 41 which is secured to the slide-bar 19 and is disposed in a slot 42 in the slide-bar 18. The slot 42 is so proportioned that, after a movement of the lever 13, sufficient to move the wedge member and open the jaws 29 and 30, the pin 41 will engage an end 43 of the slot 42. A continued movement of the lever 13 will, therefore, operate to move the bar 19 and, consequently, carry the jaws 29 and 30 longitudinally of the machine to a position to grip a loop or twisted support-member, as will be presently described.

A filament 44 to be looped and twisted may be fed from a spool 45 that is rotatably mounted upon a shaft 46 with which a bracket 47 is provided. A resilient member 48 may be provided to exert friction upon the end of the spool to produce a tension on the wire as it is unwound. The resilient member 48 may comprise an annulus 49 having a plurality of elastic radial arms 51 and may be maintained with the ends of the arms in contact with the spool by a suitable nut 52 screwed upon the end of the shaft 46. A manipulation of the nut provides for the variation of pressure in the tension of the resilient member upon the spool.

The filament 44 may be led from the spool and over guides 53 and 54, and the end of the filament may be gripped by a pair of auxiliary gripping jaws 55 and 56 which are positioned adjacent the path of the filament. The jaws 55 and 56 are operable with the jaws 29 and 30 and are extended a short distance therefrom, the jaw 56 being integral with the jaw 29 and the jaw 55 being integral with the jaw 30. When the filament is gripped by the jaws and the latter are in their remote position with respect to the spool, the filament is in position to have a loop formed thereon.

For the purpose of forming the loop, the lever arm 15 is provided with a depending stud 57 which has a longitudinal groove 58. The stud 57 is movable with the arm 15 which may be swung about the pin 16, whereby the stud may be moved to carry the filament from its normal path. However, in order to provide a loop, a pair of guide posts 59 and 61 are provided to be positioned adjacent the path of movement of the filament and in such spaced relation as to permit the passage of the stud 57 therebetween. A movement of the stud between the guide posts, will, therefore, operate to carry a portion of the filament 44 with it, thus producing a loop 60, the filament being fed from the spool 45 as the loop is formed.

The guide posts 59 and 61 are secured in, and extend upwardly from, a slidable block 62 that is connected to the standard 10 of the machine by a tap bolt 63, the shank of which is disposed in a slot 64 in the block 62. The block 62 may be reciprocated vertically to bring the guide posts in operative relation to the filament wire 44 and to remove the guide posts after a loop has been made. A reciprocation of the block may be accomplished by means of a foot treadle (not shown) which may be connected to a vertical rod 65, the upper end of which may be fastened in the block 62. The block may be normally maintained in its lower position through the action of a helical spring 66 disposed about the rod 65 and between a bearing 67 integral with the standard 10 and a collar 68 fastened to the rod 65. In addition to the bearing 67, the rod is also guided by a suitable groove 69 provided in the foot 71 of a bracket 72, the bracket being suitably secured to the standard 10.

For the purpose of twisting a loop formed in the filament wire, a rotatable member or tool 73 is journaled in a slide-plate 74, which is disposed in mitered grooves in an upright portion 75 of the bracket 72. The tool 73 may thus be moved upwardly or downwardly in the upright by reason of a vertical slot 76 through which it extends. An end 77 of the tool may be knurled to facilitate manual rotation or may be connected to means for effecting automatic rotation. The end of the tool that is adjacent to the standard 10 is provided with a flattened portion 78 having a pin 79 secured thereto in a perpendicular position.

The pin 79, as provided, is so disposed with relation to the other elements that, when the lever 15 is moved to bring the stud 57 through the guide posts 59 and 61, the stud may carry the loop so that the end thereof is over the pin 79 when the pin is in its lower position. An upward movement of the tool 73 then causes the pin 79 to enter the groove 58 in the stud 57 and also the end of the loop 60 of the filament 44 which then becomes disposed about the pin 79, and the stud may then be returned to a position away from the filament. The tool 73 may be rotated a given number of turns to twist the sections of the loop 60 together to produce a twisted member or support 80, as shown in Fig. 4. The guide posts 59 and 61 may be, and are, then lowered and removed from the vicinity of the filament and support.

An operator, when manipulating the tool 73, may align the pin 79 to the proper vertical position by sight, although means are provided for positively positioning the pin. Such means may consist of a slidable-member 81 which embraces the upright 75 and is slidable thereon. The member 81 is provided with a lock-rod 82 adapted to be moved in contact with a flattened portion 83 of a collar 84 secured to the tool 73. The flattened portion 83 is so disposed with relation to the pin 79 that, when the lock-rod 82 engages therewith, the pin 79 will be locked in its proper vertical position for entrance into the slot 58 of the stud 57 and thus into the looped filament. The slidable member 81 is secured to the bracket 72 by a tap bolt 85 which may be screwed into the bracket and may extend through a slot 86 in the member 81. Spring members 87 are secured to the member 81 and frictionally engaged with the upright portion 75 of the bracket 72 for the purpose of retaining the slidable-members 81 in any given vertical position. A handle 88 is provided for manipulation of the slidable-member 81, it being, however, understood that this member may be operated either by a foot treadle or automatically by suitably driven means, such as a cam or other element.

It will be appreciated that, when the tool 73 is in its lower position, the flattened face 83 of the collar 84 will engage the lock-rod 82, thus properly positioning the pin 79. An upward movement of the member 81 will, therefore, carry the tool to its proper position after which the slidable-member 81 may be lowered, thus permitting rotation of the tool. For the purpose of retaining the tool in its proper position and to avoid a certain amount of lost motion, a tension member 89 is provided (see Figs. 5 and 6). One end 91 of the tension member may be secured to the upright 75 and the other end 92 may bear frictionally upon the slidable-plate 74.

Although the tool 73 is shown as being provided with a pin 79 to enter the loop, it is obvious that this tool may be differently constructed. For instance, a pair of jaws may be provided to grip an end of the loop, a jaw tool for this purpose being shown in Figs. 7, 8 and 9.

As illustrated, the jaw tool may comprise a spindle 93 provided, at one end, with a relatively stationary jaw 94 and a split movable jaw 95 hinged on a pintle 96. The split-jaw 95 may comprise two members or jaws 97 and 98 (see Fig. 9). The jaws may be provided with an inclined or cam surface 99 adjacent to a loose bushing 100 in which the spindle 93 may be rotatably disposed. The bushing may be journaled in the upright 75 of the bracket 72, and the bushing 100 may be provided with flanged ends 101 to prevent endwise movement.

The spindle 93 may be provided with screw threads 102 and with a nut 103 adapted to be moved longitudinally of the spindle to cause rotation thereof. A suitable lever arm 104, having a bifurcated end pivoted to the nut 103, may be provided for producing a movement of the nut axially of the spindle 93 to cause a rotation of the spindle and the jaws. A spring 105, secured to the upright 75 and to the lever, may be provided for normally maintaining the nut 103 in contact with the bushing 100. The lever 104 may be operated either by a cam action or by a foot treadle (not shown).

When employing the jaw tool to twist a loop, the stud 57 may be replaced by a pin 106, as shown in Fig. 7. The pin 106, when moved with the lever 15, will carry the looped portion of the filament and cause the end of the filament to enter between the jaws 97 and 98, thus carrying the looped end of the filament under beveled edges 107 of the jaws. The jaws may be provided with a spring 108 (Fig. 9) to normally maintain them in close relation but permitting them to spread as the pin is thrust between them and the filament is forced under the jaws by the movement of the pin 106. The movable jaws may, if desired, be provided with a spring to maintain them normally in resilient contact with the lower or rigid jaw 94. Thus, the pin 106 may carry a loop of filament between the jaws. The jaws 97 and 98 may be mounted on their pintle with sufficient play to permit the entrance of the pin 106 therebetween, but, when the pin is removed, the jaws will return to their normal position, through the action of the spring 108, and rest upon the end of the loop. Since the frictional engagement between the pin 106 and the filament wire is comparatively small, the pin may be removed and the loop left between the jaws. If required, additional springs may be provided to press the jaws 97 and 98 normally against the jaw 94, thereby causing the jaws to initially grip the end of the loop.

The lever 104 then may be moved slightly in the direction of the arrow "Y", and cam surfaces 99 will immediately engage the bushing 101, causing the jaws 97 and 98 to more firmly grip the loop. A continued movement of the lever 104 operates to rotate the spindle 102 and, consequently, the jaws are rotated and the sections of the filament loop 60 are twisted together to form the resilient support 80.

After the twisting operation, the lever 104 may be slightly moved, in an opposite direction from the jaws 97 and 98, to release the loop, and the gripping jaws 29 and 30, previously described, may be moved to secure the twisted portion 80 and remove the end thereof from between the jaws 97 and 98 of the jaw tool.

The jaws 29 and 30 may operate in the same manner, as will be presently described, for gripping the twisted filament 80 prior to the removal of the pin 79 in the preferred construction. After the filament has been removed from between the jaws 97 and 98, the lever 104 may be returned to its normal position to bring the nut 103 contiguous with the bushing 100, thus positioning the jaws for another gripping operation.

It has been shown how a loop may be formed in a filament and how the loop may be twisted to form a flexible support member. Referring to the construction illustrated in Fig. 3, it will be noted that, after the tool 73 has been rotated and the support formed, and the block 62 has been lowered to remove the guide posts 59 and 61 from their positions adjacent to the loop, the lever 13 may be operated and the wedge 32 removed to permit an opening of the jaws 29 and 30 and 55 and 56. The jaws may then be moved by means of the lever 13 until the jaws 29 and 30 are in position above and below the twisted loop or support wire and the jaws 55 and 56 are positioned above and below a portion of the length of the filament wire. The movement of the lever 13 may then be reversed and the wedge 32 thrust beneath the extension to close the jaws which grip the twisted portion of the filament and a straight portion of the filament.

The jaws may then be moved to bring the end of the twisted loop or support 80 in operative relation to a button 111 of a lamp stem 112, indicated in dotted lines in Figs. 1 and 2. A suitable fire 110, indicated in dotted lines in Fig. 10, may be directed upon the button to render plastic a portion thereof. The stem and, consequently, the button 111 may then be moved toward the support 80 until the end of the support is embedded in the plastic portion of the button. The fire being removed, the plastic portion hardens and the support is secured to the button in the usual manner.

A lamp of the type to which this invention relates, contains a stem having an upper button 11 previously referred to, and a lower button 113. These buttons may have different relative positions upon an arbor 114, depending upon the wattage and voltage of the lamp in which they are to be incorporated.

The filaments employed in lamps of the above designated type are of zigzag form extending alternately from one button to another. Therefore, after a support wire has been inserted in one of the buttons, as, for instance, the top button, it is necessary to make the next insertion in the lower button and, at the same time, rotate the buttons a given number of degrees in order to position properly the radial support wires about the stem.

Stem holders of various types have been devised for supporting a stem and effecting its intermittent rotation. The present stem holder, as described below, also provides for the vertical reciprocation of the stem.

A stem holder 115, as illustrated in Figs. 2 and 10, answers the requirements of my invention and may comprise a pair of oscillatory arms 116 and 117. The arms 116 and 117 are secured to vertical rotatable rods 118 and 119 and the upper or free ends of the arms carry V-shaped jaws 121 and 122, respectively. The rods 118 and 119 have their lower ends rotatably disposed in suitable bearing apertures 123 provided in a rotatable bracket or carrier 124, the upper end of which is provided with guide bearings 125 in which the rods 118 and 119 are disposed. The bracket 124 is of right-angle form, and the lower or horizontal leg may be sufficiently substantial to provide a base or casing 120 in which part of the mechanism for oscillating the rods 118 and 119 may be carried.

The present type of stem holder may be manually operated, pressure being applied to a plunger 126 (Figs. 1 and 2) reciprocable in a suitable bore 127 in the base of the bracket 124. The plunger 126 is associated with the rods 118 and 119 by connecting links 128 and 129, which links are pivoted upon a stud 131 secured to the plunger 126, the stud being movable in a slot 132 in the casing. The links 128 and 129 are, in turn, pivoted to lever arms 133 and 134 which are secured to, and project from, the posts 118 and 119, respectively.

A spring 135, disposed between the end of an aperture 136 and the inner end of the plunger 126, normally operates to maintain the plunger in an outer position, thus causing an opposite oscillation of the posts and a movement of the jaws 121 and 122 toward each other. It will, therefore, be evident that the jaws 121 and 122 may be opened by a slight inward movement of the plunger 126 and that a release of the plunger will cause the jaws to grip and secure a stem when properly positioned between the jaws.

For the purpose of inserting wires at spaced intervals about a button, it is necessary to be able to rotate the button about its vertical axis. The selected stem holder permits this operation by reason of its rotatable association with an offset bearing member 137. The casing 120 of the bracket 124 is provided with a shaft 138 (Fig. 10) integral with the casing and suitably journaled in the offset member 137. The shaft 138, being rotatable in the member 137, the lower portion of the bracket 124 may bear upon the upper portion of the member 137. The shaft 138 extends through the lower end of the member 137 and may have secured thereto, a hand wheel or disc 139 disposed with its upper surface contiguous to the lower surface of the member 137. The wheel 139 may, therefore, be rotated to effect rotation of the holder as a means of indicating and temporarily maintaining the holder in a variety of positions, the disc or wheel 139 having a plurality of depressions 140 disposed at predetermined spaced intervals and at equal distances from the center of the disc.

The bearing member 137 may be provided with an aperture 141 having disposed therein, a pin 142 so positioned as to enter the depressions 140 successively when the disc is rotated. A spring 143, disposed in the aperture between the end thereof and an end of the pin 142, serves to normally urge the pin toward the disc 139 and into an aperture. By rotating the disc 139, the holder may, therefore, be moved a given number of degrees, thus rotating an arbor held therein to a position a button with the periphery thereof in different angular positions.

If, for instance, a stem is to be made with five top support wires and four bottom support wires, the disc will obviously be provided with nine depressions, inasmuch as a lower support wire will be positioned midway between two support wires of an upper button. Thus, with each insertion, the holder will be moved one half the distance of the space between the support wires.

In the drawing, the top button 111 is shown in operative relation to the inserting mechanism. Means are, however, provided whereby the holder may be moved upwardly to place the lower button in position for the insertion of a support wire. This is accomplished by providing the bearing member 137 with an arm 144 slidably disposed upon a guide rod 145 having a longitudinal slot 146 to receive a key 147 secured in the arm 144, thus preventing a movement of the member 137 about the vertical axis of the guide rod 145.

When the bearing member 137 has been moved upwardly to bring a lower button in proper relation to the jaws 29 and 30, it may be temporarily maintained in such position by reason of the engagement of a pin 149 that is adapted to enter a depression 150 in the guide rod 145. The pin 149 may be disposed in an aperture 151 in a boss integral with the member 138, and a spring 152 may be provided to normally urge the pin toward the guide rod 145. A screw cap 160 serves to close the aperture 151 and to oppose the expansion of the spring 152.

The guide rod 145 is secured in a stud 148 that is integral with a slide-plate 153 having movable relation to guides 154. The slide-plate, therefore, carries the stem holder 115 and is also provided with an upright 155 (Fig. 10) having a bracket 156 in which a nozzle or burner 157 may be secured and adapted to direct the fire 110 upon a button. An additional projection 161 may also be integral with the upright to afford a bearing for a lever member 162 having a baffle plate 163 at one end thereof, which may be positioned in the path of the fire 110 and be removed therefrom by a manipulation of an arm 164 of the lever-member.

It will be understood that, since the stem-holder and burner are mounted upon the slide-plate 153, this plate may be so positioned with relation to the jaws 29 and 30, which grip the support wire, that a movement of the plate will operate to bring a button in close relation to the jaws 29 and 30, and the fire, issuing from the burner 157, will always be maintained in a fixed relation to the button. This is desirable since the fires are directed upon the button, previous to movement thereof toward the support wire, to render plastic a small area by the time the button has been moved for the insertion of the support wire.

The movement of the stem-holder toward or away from the jaws 29 and 30 may be accomplished automatically by a suitable cam action or by the means shown which may comprise a lever 166 pivoted upon a tap bolt 167 and having its short arm 168 (Figs. 1 and 2) provided with a slot 169 through which a pin 171, secured in the slide-bar 153, extends. The opposite or long arm 172 may serve as a handle for oscillating the lever about its pivot point and thus cause a reciprocation of the slide-plate 153, with a consequent movement of a stem toward or away from a support wire held in the jaws 29 and 30.

It has been found desirable to anneal the filament or wire after the operation of certain mechanical elements, preferably after the wire has been twisted to provide an integral relatively rigid support member. The annealing operation serves to remove certain irregularities that are due to the resiliency of the wire and, in addition, gives the wire a set which enables it to retain the form given by the mechanical elements. Although the annealing may be performed by a suitable fire, it is preferable to provide means for electrically heating, and thus annealing, the wire.

Mechanism for this purpose is well known and the example illustrated in Fig. 11 shows one such mode of annealing. As shown, the annealing operation may be performed after the wire has been drawn between the guide posts 59 and 61 and twisted by the twisting tool which then aids in holding the twisted portion 80 in a substantially horizontal position. It will be noted that the filament wire is bent sharply around the posts 59 and 61, and it is mainly to maintain sharp bends between the rectilinear portions of the wire and the sections of the twisted loop that the wire is annealed.

For the purpose of heating the wire, an electrical current may be passed therethrough, a suitable source of electrical energy, as, for instance, a generator 176, being connected to leads 177 and 178 of the primary 179 of a step-down transformer 181. A switch 182 may be provided to make and break the circuit at will. The secondary 183 of the transformer may have one of its leads 184 connected to the jaws 29 and 30 or connected to the slide-bar 19 which carries the jaws. The other lead 185 may be connected to a projecting end of a spindle 186 mounted in a bearing arm 187. The spindle may be insulated from the bearing by a suitable non-conductive bushing 188. An opposite projecting end 189 of the spindle 186 may be provided with a roller 191 that is adapted to rotate about the spindle and is so disposed as to make contact with the filament wire 44 which may be moved beneath the roller. A bearing or supporting block 192 may be provided to maintain the filament in contact with the roller, the block being supported on a bracket 193 and suitably insulated therefrom.

The annealing operation is performed when the jaws 29 and 30 have been operated to grip a twisted portion of the wire and move it to the inserting position and another loop has been formed and twisted. The annealing is done when one twisted portion is retained by the jaws 29 and 30 and another twisted portion is secured to the tool 73. It will be obvious that the filament is also gripped by the jaws 55 and 56. Thus, when the current is permitted to flow, the wire will be heated between the jaws 55 and 56 and the roller 191. Although the current will be short circuited and prevented from passing through the twisted support-member, it will travel a sufficient distance up the twisted portion of the wire to heat the bends about the posts 59 and 61, thus attaining the desired result of setting sections of the loop at the bend in order that they may retain sharp angles.

It will also be understood that the roller 191 may be positioned a sufficient distance away from the point at which the loop is formed to provide a relatively long portion of annealed filament prior to the looping operation. It will, therefore, be appreciated that, when a loop is formed, the filament wire will already have been annealed but a second annealing may be given to set the wire at the bends, as above described.

Considerable advantage is derived from this operation, inasmuch as the provision of right-angle bends adjacent the twisted portion of the filament are important. Ordinarily, the filament would have bends of relatively large radii at the points where they were bent about the posts 59 and 61 since without annealing, they would tend to assume their original positions, thereby causing considerable trouble in the mounting operation. The annealing is also of advantage in removing irregularities from the wire, leaving it relatively straight between the support-members when mounted on a stem.

In practice, a continuous strip of filament or wire having supports integral therewith may be produced for application to a machine for inserting the supports into a stem. It has been found preferable, however, to operate the present machine in connection with a stem and to insert the supports into the buttons of the stem subsequent to the formation of the supports.

In practice, when it is desired to secure a filament to a stem, the stem holder is first positioned in its removed or normal position away from the machine. A stem may then be positioned in the holder with the upper button in proper alignment adjacent the path of the support-gripping jaws 29 and 30, the jaws being at the time in their remote position with respect to the spool 45 of filament.

The lever 13 may be moved slightly away from the jaws, thereby removing the wedge member 32 and permitting the jaws to open. The filament or wire 44 may then be drawn from the spool 45 through the guides and between the jaws 55 and 56. The jaws may then be closed by an opposite movement of the lever 13 and the wire be thus gripped and held taut. The guide posts 59 and 61 may then be moved upwardly to a position adjacent to the filament wire, after which the lever 15 is moved to bring the stud 57 between the guide posts, thereby carrying the filament wire between the posts and producing a loop 60. The twisting tool 73 is then moved upwardly until the pin 79 thereon enters the end of the loop, whereupon the twisting tool may be operated to twist the sections of the loop together and produce a relatively rigid support member 80.

While the wire and support are thus held, the support and the length of filament on each side thereof may be annealed by an application of a flame in any suitable manner. However, as described and shown in Fig. 11, the annealing may be accomplished electrically. The guide posts 59 and 61 are then lowered to be out of the path of movement of the jaws 55 and 56. The lever 13 may then be moved to open the jaws and to bring the support-gripping jaw 29 and the jaw 30, respectively, above and below the support while the support is still secured by means of the twisting tool 73. A slight reverse movement of the lever 13 may then be caused to bring the support-gripping jaws together to secure the support and, at the same time, the jaws 55 and 56 will grip the straight portion of the wire. The twisting tool is then lowered to remove the pin 79 from within the loop of the filament.

A continued movement of the lever 13 causes the jaws to move and carry the support member to a position in operative relation to a button for insertion, the first insertion being in a top button. The fire is then directed upon a portion of the button which is rendered plastic, and the holder is moved to bring the button toward the support 80 until the end of the support wire enters the plastic portion, at which time the fire is removed and the hardening material secures the support.

The jaws remain closed upon the support, however, and another support member is produced by a repetition of the operations above described, including the annealing operation. The jaws are then released from the inserted support member and are moved to position and caused to grip the last formed support member.

The twisting tool 73 is then moved from engagement with the loop, and the jaws, while closed, are moved a short distance toward the stem holder to produce slack in the filament wire. The stem holder may then be rotated a given number of degrees to provide for the proper radial spacing of the supports, after which the holder may be raised to bring the lower button in operative relation to jaws 29 and 30. The heating and inserting operations are then performed in the same manner as above described.

After the proper number of support wires have been inserted, the last support wire will be secured to a top button, and a sufficient length of wire may then be left to permit clamping thereof to a leading-in wire, either while the stem is in the present machine or as a separate operation.

It will be obvious that the present invention overcomes considerable difficulty in the mounting of filament wire and provides a machine in which the wire is handled by mechanical elements without the exercise of special skill and mental strain on the part of an operator.

It is to be understood that, although the machine, as illustrated, constitutes an embodiment of the present invention, many modifications may be made therein without departing from the spirit and scope of the appended claims.

What is claimed is:—

1. A machine for mounting wire comprising means for feeding wire, means for positioning given sections of said wire in near relation, means for securing said sections, means for twisting one section about another, means for supporting a non-conductive lamp part and means for inserting said twisted sections into said part.

2. A machine for mounting filaments which comprises a support for a non-conductive lamp part, means for feeding filament, means for twisting two sections of said filament together to provide a reinforced section and means for inserting an end of said reinforced section into a non-conductive lamp part.

3. A machine for mounting filaments which comprises a stem holder, a filament guide, an oscillatory arm, means for actuating said arm to produce a loop in said filament, means for twisting said loop to provide a relatively stiff portion of said filament to constitute a support and means for inserting said support into a stem positioned in said holder.

4. A machine for mounting filaments which comprises a stem holder, a filament guide, an oscillatory arm, means for actuating said arms to produce a loop in said filament, a reciprocable pin, means for moving said pin into said loop and means for actuating said pin to twist the loop to wind the sections thereof together and produce a relatively stiff portion of filament to constitute a support and means for inserting an end of said support into a button of a stem positioned in said holder.

5. A machine for mounting filaments which comprises a stem holder, a filament guide, an oscillatory member, means for actuating said member to produce a loop in said filament, a rotary member for engaging the end of said loop and twisting sections of said loop together to provide a relatively stiff portion to constitute a support and means for inserting said support into a stem positioned in said holder.

6. A machine for mounting filaments which comprises a stem holder adapted to be reciprocated, means for feeding a filament in a rectilinear direction, an oscillatory member, means for actuating said member to produce a loop in said filament, means for twisting said loop to provide a filament support, means for inserting an end of said support into one of the buttons of a stem positioned in said holder, means for moving said holder to position for the insertion of a support in another button of said stem, said support being produced by the above mentioned means.

7. A machine for mounting filaments which comprises a stem holder adapted to be reciprocated, a filament guide, a movable member, means for actuating said member to produce a loop in said filament, means for twisting said loop to provide a support, means for moving said support in operative relation to a button of a stem positioned in said holder, means for locally heating said button and means for moving said holder to effect an insertion of said support into said button.

8. A machine for mounting filaments which comprises a stem holder adapted to be reciprocated, a filament guide, a movable member, means for actuating said member to produce a loop in said filament, means for twisting said loop to provide a support, means for moving said support in operative relation to a button of a stem positioned in said holder, means for locally heating said button, means for moving said holder to effect an insertion of said support into said button and means for moving said holder to position for the insertion of another support in another portion of said stem.

9. A machine for mounting filaments which comprises a filament support, a filament guide, jaws adapted to grip and move said filament through said guide, an oscillatory finger adapted to move and carry a portion of the length of said filament between guide posts to produce a loop in said filament, means for twisting said loop to provide a reenforced portion in said filament, means for supporting an arbor and means for inserting the end of said reenforced portion into said arbor.

10. A machine for mounting filaments which comprises a filament support, a filament guide, jaws adapted to grip and move said filament through said guide, an oscillatory finger adapted to move and carry a portion of the length of said filament between guide posts to produce a loop in said filament and means for twisting said loop, means for supporting an arbor, means for rendering said arbor plastic to receive an end of said loop and means for inserting said end in the plastic portion.

11. A machine for mounting filaments which comprises a filament support, means for moving a filament, an oscillatory finger adapted to move and produce a loop in a portion of the length of said filament, a pin mounted on a rotatable carrier, means for moving said pin into said loop, means for rotating said carrier to twist sections of said loop together, jaws adapted to grip said twisted loop, means for actuating the jaws to carry said twisted loop and position the end thereof adjacent the button of a stem positioned in said holder, means for locally heating a portion of said button and means for moving said holder to cause an insertion of said twisted portion into said button.

12. A machine for mounting filaments which comprises means for supporting and feeding filament, means for forming a loop in said filament, a rotatable carrier, a pin mounted on said carrier, means for moving said pin into said loop, means for rotating said carrier to twist the sections of said loop together to provide a support, means for removing said pin from said loop, reciprocable gripping jaws, a stem holder disposed adjacent the path of said gripping jaws, means for actuating said jaws to carry said support and position the end thereof adjacent a button of a stem secured in said holder, means for locally heating a portion of said button, means for moving said holder to effect an insertion of said support into said button and means for changing the relative position of said holder to position another button adjacent to the path of said jaws whereby another support may be inserted into another button of said stem.

13. A machine for mounting filaments which comprises a filament support, means for feeding said filament in a rectilinear path, means for diverting said filament from said path to produce a loop, a rotatable carrier having a pin mounted thereon, means for moving said pin into said loop, means for rotating said carrier to twist the sections of said loop together to provide a support, means for removing said pin from said loop, reciprocable gripping jaws, a stem holder disposed adjacent the path of said gripping jaws, means for actuating said jaws to carry said support and to position the end thereof adjacent a button of a stem secured in said holder, means for locally heating a portion of said button, means for moving said holder to effect an insertion of said support into said button, means for rotating said holder a given number of degrees and means for changing its relative position to dispose another button adjacent the path of said jaws, means for locally heating said last mentioned button and means for moving said holder to effect an insertion of said support into said button.

In testimony whereof, I have hereunto subscribed my name this ninth day of November, 1922.

JOHN JOSEPH HIGGINS.